US012139378B2

(12) United States Patent
Miyata et al.

(10) Patent No.: US 12,139,378 B2
(45) Date of Patent: Nov. 12, 2024

(54) CONTROL SYSTEM AND CONTROL METHOD FOR CRANES

(71) Applicant: MITSUI E&S MACHINERY CO., LTD., Tokyo (JP)

(72) Inventors: Junya Miyata, Oita (JP); Kouji Oka, Oita (JP)

(73) Assignee: Mitsui E&S Co., Ltd., Tokyo (JP)

( * ) Notice: Subject to any disclaimer, the term of this patent is extended or adjusted under 35 U.S.C. 154(b) by 1082 days.

(21) Appl. No.: 16/499,113

(22) PCT Filed: Mar. 16, 2018

(86) PCT No.: PCT/JP2018/010637

§ 371 (c)(1),
(2) Date: Sep. 27, 2019

(87) PCT Pub. No.: WO2018/180646

PCT Pub. Date: Oct. 4, 2018

(65) Prior Publication Data

US 2020/0039798 A1 Feb. 6, 2020

(30) Foreign Application Priority Data

Mar. 29, 2017 (JP) ................................ 2017-065304

(51) Int. Cl.
*B66C 13/48* (2006.01)
*B66C 13/22* (2006.01)
*B66C 19/00* (2006.01)

(52) U.S. Cl.
CPC .............. *B66C 13/48* (2013.01); *B66C 13/22* (2013.01); *B66C 19/007* (2013.01)

(58) Field of Classification Search
CPC ........ B66C 13/48; B66C 13/22; B66C 19/007
(Continued)

(56) References Cited

U.S. PATENT DOCUMENTS 7,032,763 B1 * 4/2006 Zakula, Sr. ........... B66C 19/007 701/44
2005/0242052 A1 * 11/2005 O'Connor ............ B66C 19/007 212/344
2015/0360918 A1 12/2015 Ko

FOREIGN PATENT DOCUMENTS

CA 2746839 A1 * 1/2012 ............ B66C 13/48
JP H08115127 A * 5/1996
(Continued)

OTHER PUBLICATIONS

JP-2003261284-A_09-2003_Fujiwara et al_english_translation, 2003.*
(Continued)

*Primary Examiner* — Jelani A Smith
*Assistant Examiner* — George A Alcorn, III
(74) *Attorney, Agent, or Firm* — Carrier, Shende & Associates, P.C.; Joseph P. Carrier; Jeffrey T. Gedeon

(57) ABSTRACT

Provided are a control system and a control method for cranes which, by reducing the distortion of a structural member, are capable of shortening the time necessary for correcting positional deviations and directional deviations resulting from the distortion, thereby improving the efficiency of cargo handling work. A control system includes receivers and a control device and is configured in such a way that the control device adjusts the speed of each of paired propelling devices based on the coordinates of positions determined by the receivers to perform control to decrease the change in relative positions between the receivers in plan view.

7 Claims, 8 Drawing Sheets

(58) Field of Classification Search
USPC .......................................................... 701/50
See application file for complete search history.

(56) References Cited

FOREIGN PATENT DOCUMENTS

| | | | | |
|---|---|---|---|---|
| JP | 2000112524 | A | * | 4/2000 |
| JP | 2000229779 | A | * | 8/2000 |
| JP | 2003226485 | A | * | 8/2003 |
| JP | 2003261284 | A | * | 9/2003 |
| JP | 2004-287571 | A | | 10/2004 |

OTHER PUBLICATIONS

JP-H08115127-A_05-1996_Hoshina et al_english_translation, 1996.*
JP-2000229779-A_08-2000_Takahashi and Nishiyama_english_translation, 2000.*
JP-2000112524-A_04-2000_Hayashi and Shibata_english_translation, 2000.*
JP_2000112524_A_04_2000_Hayashi_and_Shibata_english_translation (Year: 2000).*
JP_2000229779_A_08_2000_Takahashi_and_Nishiyama_english_translation (Year: 2000).*
JP_2003261284_A_09_2003_Fujiwara_et_al_english_translation (Year: 2003).*
JP_H08115127_A_05_1996_Hoshina_et_al_english_translation (Year: 1996).*

* cited by examiner

FIG. 10
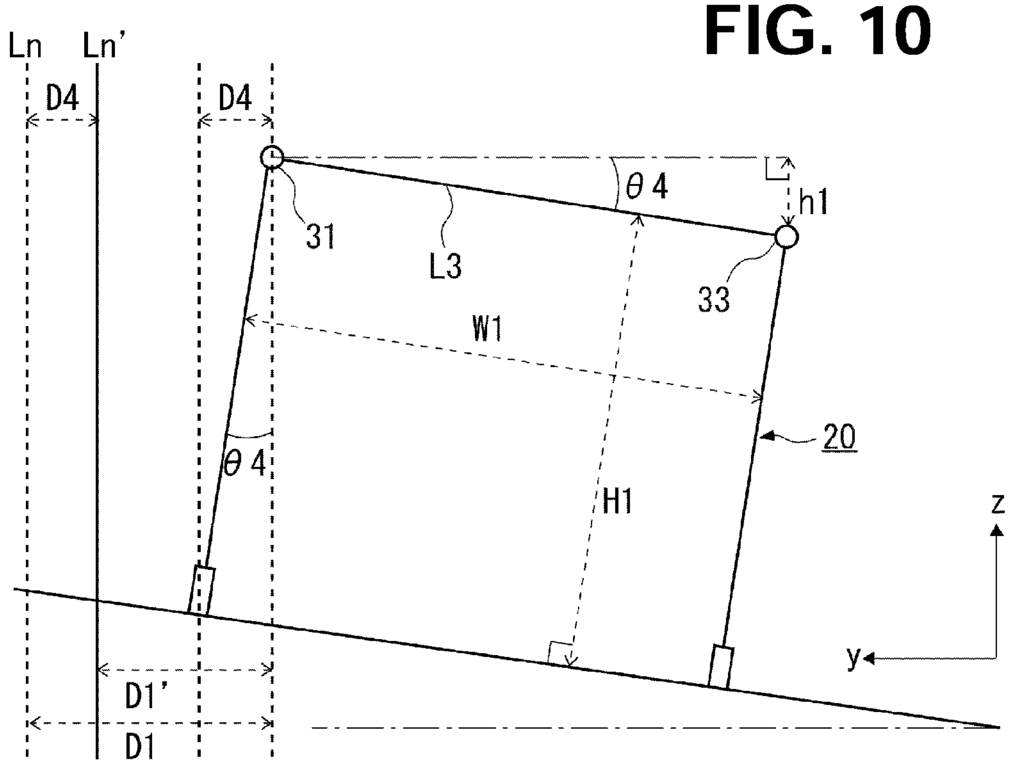
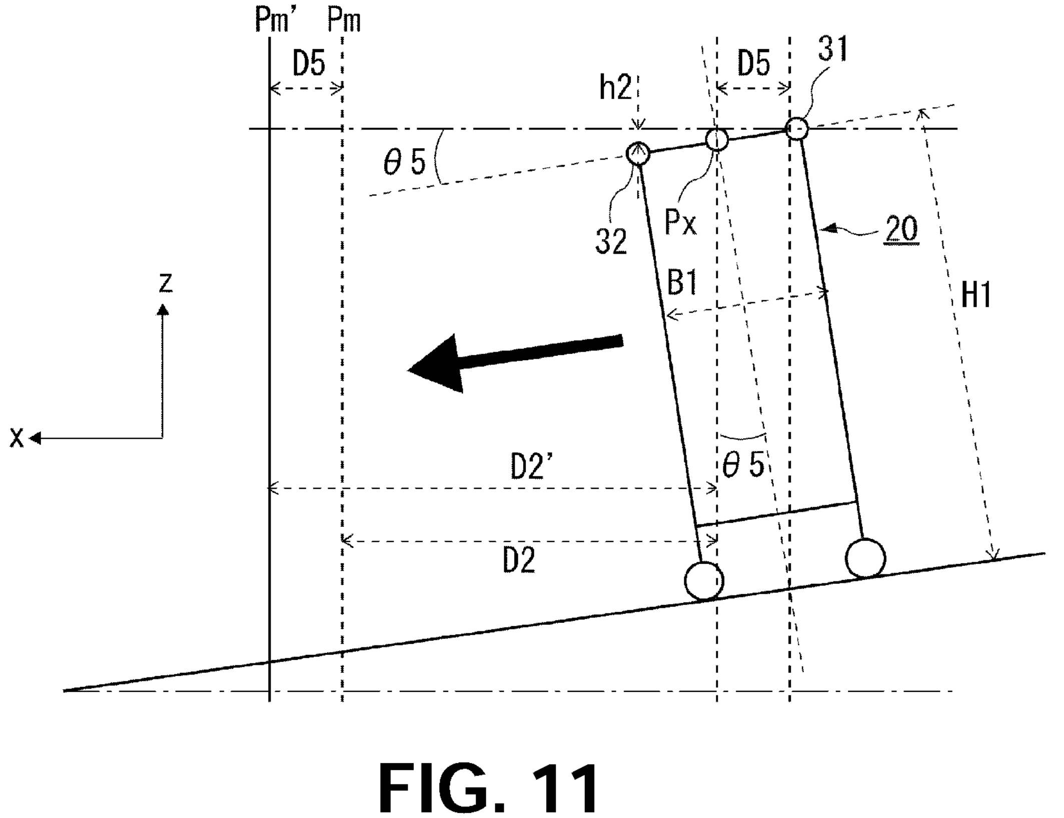
FIG. 11

CONTROL SYSTEM AND CONTROL METHOD FOR CRANES

TECHNICAL FIELD

The present invention relates to control systems and control methods for cranes and more particularly relates to control systems and control methods for cranes that improve the efficiency of cargo handling work.

BACKGROUND ART

For gantry cranes for use in container yards, ones having receivers for a global navigation satellite system (GLASS) are being proposed for detecting the current position and controlling the travel (for example, see Patent Document 1). A gantry crane proposed in Patent Document 1 adjusts a pair of right and left propelling devices, based on the coordinates of positions obtained by receivers, by performing PI control (proportional control, integration control) using a positional deviation and directional deviation relative to a reference line as deviations.

PRIOR ART DOCUMENT

Patent Document

Patent Document 1: Japanese patent application Kokai publication No. 2004-287571

SUMMARY OF THE INVENTION

Problem to be Solved by the Invention

One of disturbances in the travel control of the gantry crane or the like is distortion of the structural member having girders supporting the hanging tool hung from the girders. The gantry crane disclosed in the above Patent Document 1 has no measure against the distortion in the structural member. Thus, it has a problem that in the case where an excessive distortion occurs in the structural member in traveling, the force with which the structural member seeks to recover from the distorted state to the original state moves both ends of the structural member, causing positional deviations and directional deviations.

An object of the present invention is to provide a control system and control method for cranes that improves the efficiency of cargo handling work by reducing the distortion of the structural member and, in turn, shortening the time necessary for correcting positional deviations and directional deviations resulting from the distortion.

Means for Solving the Problem

A control system for a crane, according to the present invention to achieve the above object is a control system for a crane including a hanging tool movable up and down, a structural member having a girder that extends in one direction and supports the hanging tool hung from the girder, and paired propelling devices attached to the structural member to be apart from each other in the extending direction of the girder, characterized in that the control system comprises: multiple receivers disposed on the structural member to be apart from each other in plan view; and a control device communicably connected to the receivers and the paired propelling devices, the receivers are configured to determine coordinates of a position, utilizing a global navigation satellite system, and the control device is configured to adjust the speed of each of the paired propelling devices based on the coordinates of the multiple positions determined by the multiple receivers to perform control to decrease change in the relative position between the receivers in plan view.

A control method for a crane, according to the present invention to achieve the above object is a control method for a crane, used for running the crane by separately driving paired propelling devices that are attached to a structural member having a girder extending in one direction and configured to support a hanging tool hung from the girder and are located apart from each other in the extending direction of the girder, characterized in that the control method comprises: determining, with multiple receivers disposed on the structural member to be apart from each other in plan view, the coordinates of multiple positions, utilizing a global navigation satellite system; calculating, with a control device, change in the relative position between the receivers in plan view based on the determined coordinates of the positions; and decreasing the change in the relative position by adjusting the speed of each of the paired propelling devices based on the calculated change in the relative position.

Effects of the Invention

In the present invention, a crane is run with the speed of each of the paired propelling devices being adjusted so as to decrease the change in the relative position between the receivers. Specifically, the distortion generated in the structural member of the crane is detected from the change in the relative position between the receivers and the crane is run so as to reduce the distortion.

With this operation, it is possible to bring the structural member close to the state where no distortion is generated while the crane is traveling. This is advantageous for avoiding the occurrence of excessive distortions in the structural member of the crane in traveling, shortening the time necessary for correcting positional deviations and directional deviations that would otherwise result from the distortion. Along with this effect, the efficiency of cargo handling work with the crane will be improved.

BRIEF DESCRIPTION OF THE DRAWINGS

FIG. 10 is a back view from arrow X in FIG. 4 as an example.

FIG. 11 is a side view from arrow XI in FIG. 4 as an example.

MODES FOR CARRYING OUT THE INVENTION

Hereinafter, description will be made of an embodiment of a control system and travelling control method for cranes according to the present invention. In the figures, the x-direction indicates the longitudinal direction of storage lanes 13, the y-direction the lateral direction of the storage lanes 13, and the z-direction the vertical direction.

Figure 1:
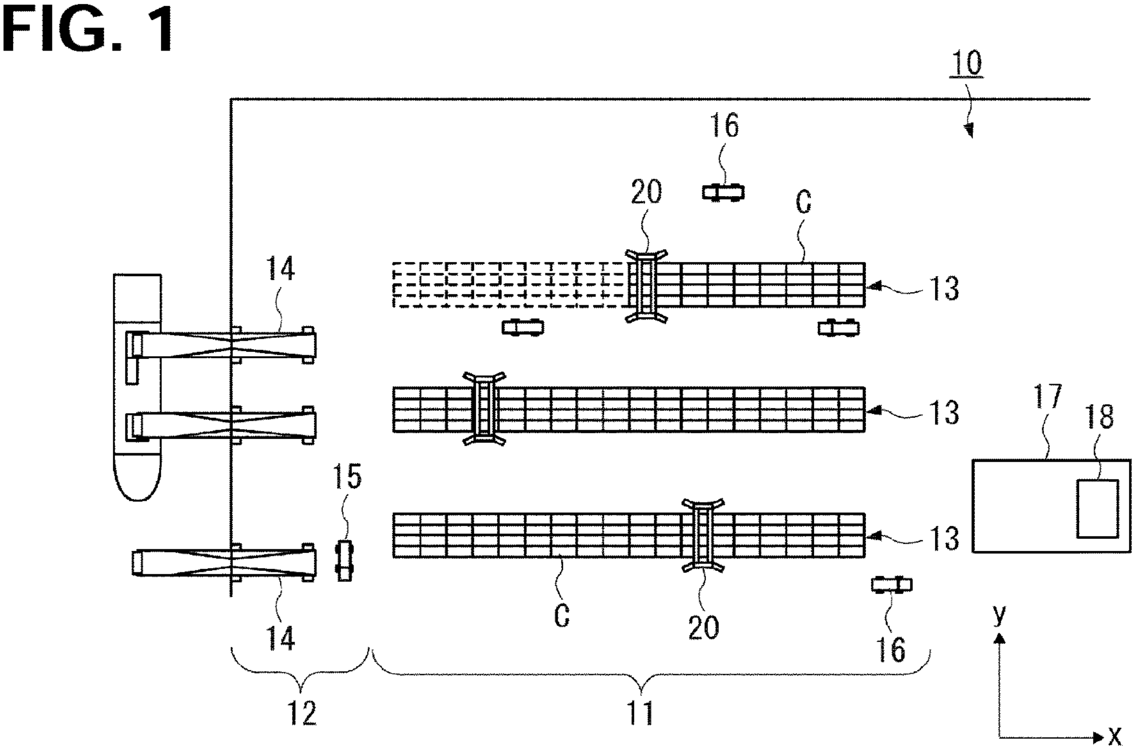
FIG. 1 is a plan view of a container terminal in which cranes having a control system of an embodiment of the present invention travel.
Figure 2:
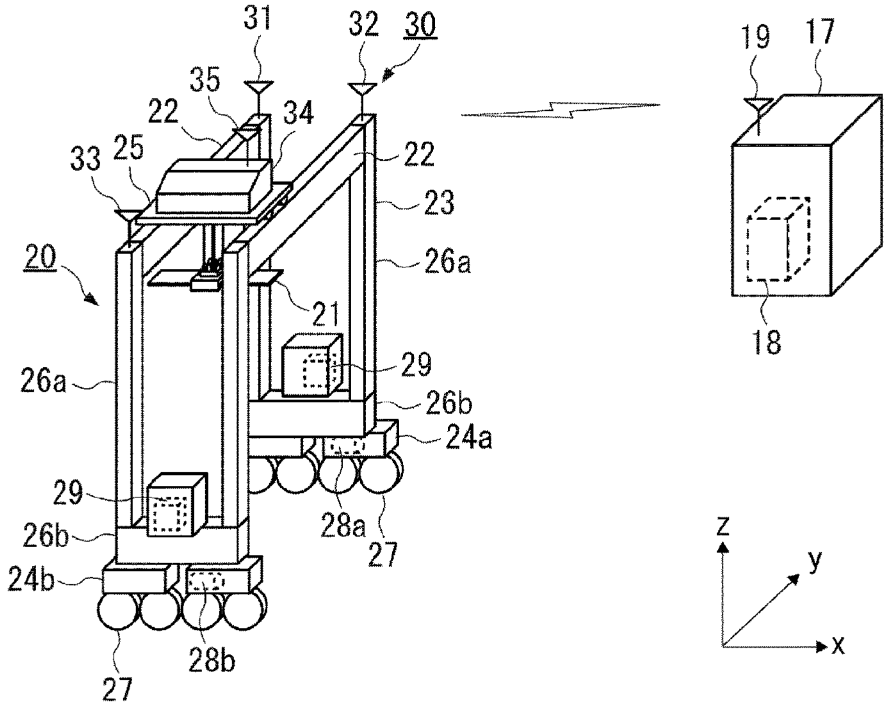
FIG. 2 is a perspective view of an example of a crane in FIG. 1.
Figure 3:
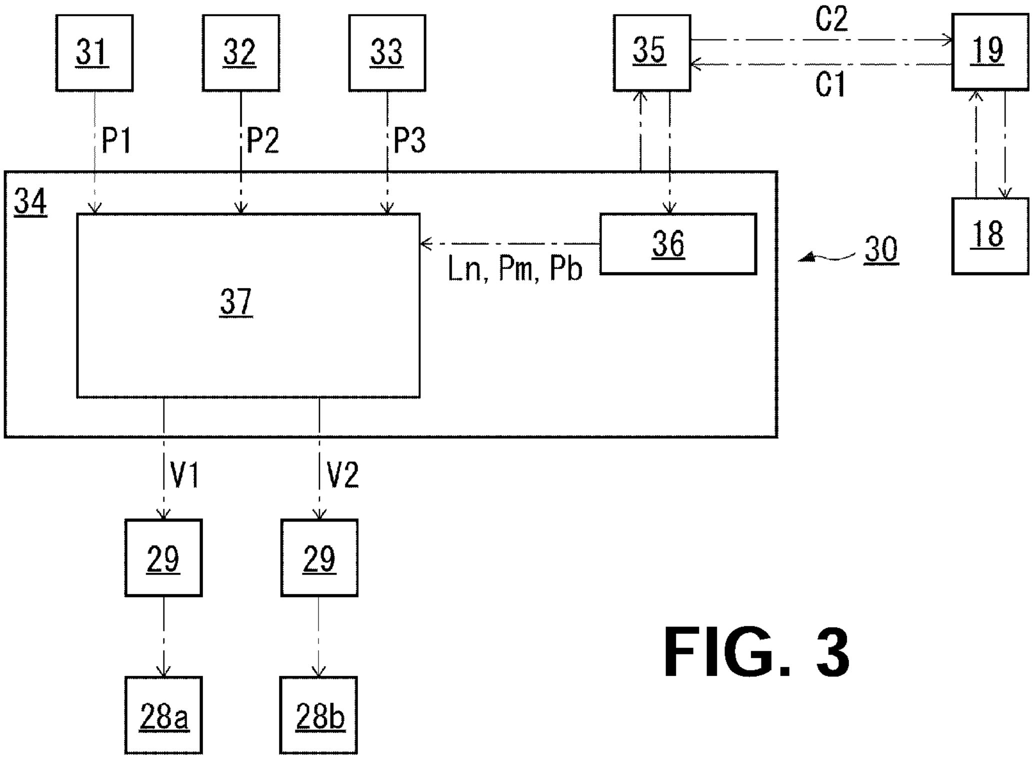
FIG. 3 is a block diagram illustrating an example of the control system in FIG. 2.

As illustrated in FIGS. 1 to 3 as examples, a control system 30 of a first embodiment is a system for controlling the travel of gantry cranes 20 that stevedore containers C in a container terminal 10.

As illustrated in FIG. 1 as an example, the container terminal 10 has two sections, a container yard 11 and a ship-loading area 12 adjoining to each other in the x-direction. The container yard 11 includes multiple storage lanes 13 where a large number of containers C are stored. The ship-loading area 12 includes multiple quay cranes 14 which travel on rails laid along the quay. The storage lanes 13 may be provided such that the longitudinal direction of the storage lanes 13 is oriented in the y-direction.

In the container terminal 10, on-site chassis 15 and outside-transportation chassis 16 travel. The on-site chassis 15 transport containers C between the container yard 11 and the ship-loading area 12, and the outside-transportation chassis 16 transport containers C between the container yard 11 and the outside travel. In the container terminal 10, also multiple gantry cranes 20 travel along the storage lanes 13 in the x-direction straddling over the storage lane 13.

There is an administration building 17 in the container terminal 10. The administration building 17 has a host system 18 and a communication unit 19, and the host system 18 issues instructions or the like on cargo handling works to cargo handling equipment (14 to 16, and 20) via the communication unit 19.

Examples of the container terminal 10 include an automated terminal in which the cargo handling equipment can perform cargo handling automatically according to instructions from the host system 18 and a terminal in which a remote controller or the like provided in the administration building 17 can operate the cargo handling equipment remotely. A terminal in which drivers on board directly operate the cargo handling equipment is also an example of the container terminal 10.

As illustrated in FIG. 2 as an example, the gantry crane 20 includes a hanging tool 21, a structural member 23 including girders 22, and paired propelling devices 24*a* and 24*b*.

The hanging tool 21 ascends and descends in the z-direction by means of wire hanging from a trolley 25 which is capable of moving laterally along the girders 22 in the y-direction. The structural member 23 includes the girders 22, the trolley 25, and legs (26*a*, 26*b*) and has approximately a rectangular shape the longitudinal direction of which is oriented in the y-direction and the lateral direction of which is oriented in the x-direction in plan view. The girders 22 extend in the y-direction and support the hanging tool 21 hung from the girders 22 via the trolley 25. The leg portion includes four leg members 26*a* extending in the z-direction and two horizontal beams 26*b* each connecting the lower ends of leg members 26*a* adjacent to each other in the x-direction. Note that the upper ends of leg members 26*a* adjacent to each other in the y-direction are connected by the girders 22. The propelling devices 24*a* and 24*b* are located apart from each other in plan view in the y-direction, which is the direction in which the girders 22 extend, and attached to the lower end of the structural member 23.

The paired propelling devices 24*a* and 24*b* are located at the lower ends of the horizontal beams 26*b* and have wheels 27 composed of rubber tires, electric motors 28*a* and 28*b*, and inverters 29. When the inverters 29 drive the electric motors 28*a* and 28*b*, the wheels 27 rotate, and the propelling devices 24*a* and 24*b* travel in the x-direction, which is the lateral direction of the structural member 23. The right and left propelling devices 24*a* and 24*b* are in a pair and are located apart from each other at both ends in the y-direction of the structural member 23 in plan view, and the right and left electric motors 28*a* and 28*b* can be driven independently of each other.

The gantry crane 20 may have wheels 27 composed of, for example, iron wheels that travel on rails, and the gantry crane 20 may travel on rails laid along the storage lane 13. The electric power for driving the electric motors 28*a* and 28*b* is supplied from a not-illustrated battery or a generator provided on the gantry crane 20. Alternatively, the electric power is supplied from the outside via cables, bus bars, or the like.

The control system 30 includes three receivers 31 to 33, a control device 34, and a communication unit 35. The control system 30 controls the travel of the gantry crane 20 by adjusting the rotation speed of each of the electric motors 28*a* and 28*b* using the inverter 29 according to cargo-handling-work instructions C1 from the host system 18.

The three receivers 31 to 33 are devices that obtain the coordinates of the positions P1 to P3 of the three receivers themselves. Specifically, the receivers 31 to 33 are antennas for a global navigation satellite system (GLASS) and obtain the coordinates of positions P1 to P3 including the longitude, latitude, and altitude at specified intervals, based on information such as time receiving from multiple satellites. Examples of methods of obtaining the coordinates of positions P1 to P3 using the receivers 31 to 33 include the single positioning, relative positioning, DGPS (differential GPS) positioning, and RTK (real time kinematic GPS) positioning. The receivers 31 to 33 may obtain the longitude and the latitude as plain coordinates using a global navigation satellite system and obtain the altitude by communicating with the host system 18.

The receiver 31 and the receiver 32 are located apart from each other at both ends in the x-direction, which is the direction orthogonal to the extending direction of the girders 22 in plan view and which is the lateral direction of the structural member 23. The receiver 31 and the receiver 33 are located apart from each other at both ends in the y-direction, which is the extending direction of the girders 22 in plan view and which is the longitudinal direction of the structural member 23. Specifically, assuming that the shape of the structural member 23 of the gantry crane 20 in plan view is approximately a rectangle, the three receivers 31 to 33 are located at three corners of the four corners of the rectangle. In other words, the three receivers 31 to 33 are located to form a right triangle in plan view the apexes of which are the three receivers 31 to 33.

Although the receivers 31 to 33 may be located at some midpoints on the leg members 26*a* of the gantry crane 20 or near the propelling devices 24*a* and 24*b*, it is desirable that the receivers 31 to 33 be located at upper positions of the structural member 23, such as the upper ends of the leg members 26*a* or the girders 22, because the receivers 31 to 33 there will have higher sensitivities to receive information from satellites.

The control device 34 is hardware including a CPU for performing various kinds of information processing, an internal storage device to and from which programs used for the various kinds of information processing and the results of information processing can be written and read, and various interfaces.

As illustrated in FIG. 3 as an example, the control device 34 is electrically connected to the electric motors 28*a* and 28*b*, the inverters 29, the three receivers 31 to 33, and the communication unit 35.

The control device 34 has a setting unit 36 and a control unit 37 as functional elements. These functional elements are stored in the internal storage device of the control device 34 as programs, which are read and executed by the CPU. Each functional element may be implemented as separate hardware such as a programmable logic controller. Alternatively, these functional elements may be integrated into a single functional element.

The setting unit 36 is a program that sets reference line Ln, target position Pm, and deceleration start position Pb. The control unit 37 is a program that performs travel control for accelerating the gantry crane 20 or for running it at a rated speed and traveling stop control for decelerating and stopping the gantry crane 20.

In the following, in FIG. 4, the direction from the left toward the right in the x-direction is defined as positive, and the opposite direction is defined as negative. The time from the start of travel to the end of travel of the gantry crane 20 is divided into acceleration period T1, rated period T2, and deceleration period T3. In addition, travel speed Vx which is the travel speed in the x-direction of the gantry crane 20 is set such that it increases at an approximately constant rate (accelerated at acceleration a) during acceleration period T1, that it is approximately constant during rated period T2, and that it decreases at an approximately constant rate (decelerated at deceleration b) during deceleration period T3.

Figure 4:
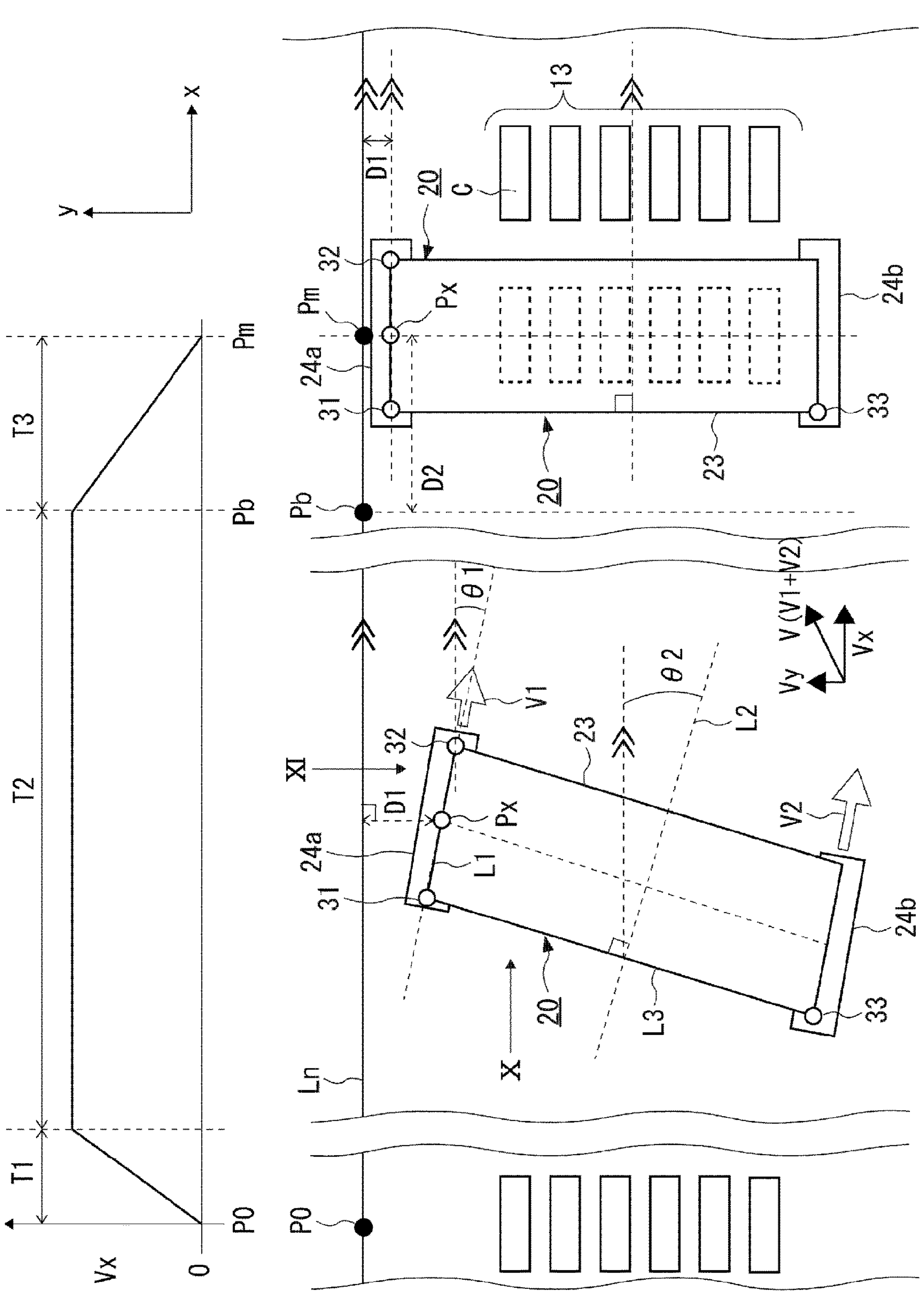
FIG. 4 includes plan views of an example of a traveling crane and an example of a crane not traveling.

As illustrated in FIG. 4 as an example, the setting unit 36 sets reference line Ln based on a lane number specified by a cargo-handling-work instruction C1 and sets target position Pm on reference line Ln based on the bay number. Note that the lane number indicates the address assigned to each storage lane 13, and the bay number is the address assigned to the storage position for a container C in the longitudinal direction of the storage lane 13.

Reference line Ln is a line of the travel reference for the gantry crane 20 traveling along the storage lane 13, and reference line Ln is set and stored in the internal storage device in advance. Reference line Ln is set on a side in the y-direction of the storage lane 13 and extends in the x-direction which is a direction intersecting the y-direction in which the girders 22 extend. The latitude and longitude of all the points existing on reference line Ln can be calculated. Note that reference line Ln may be set to be overlapped with the storage lane 13 in plan view.

Target position Pm is on reference line Ln. Target position Pm is the intersection point of reference line Ln and the line passing through the center in the x-direction of containers C stored at a specified bay number.

Deceleration start position Pb is on reference line Ln. Deceleration start position Pb is the position that is deceleration distance D2 away from target position Pm toward the left side in the x-direction. Deceleration distance D2 means the distance for which the gantry crane 20 travels until it stops if deceleration starts now. Specifically, deceleration distance D2 is always calculated as the movement distance expected for the case where the gantry crane 20 decelerates at a constant deceleration b until the current travel speed Vx becomes zero. Note that deceleration b may be set by selecting a desired deceleration time. For example, in the case where 5 seconds is selected as a deceleration time, the value that allows the gantry crane 20 to stop in 5 seconds from rated speed V0 is set. Alternatively, deceleration b may be set such that it changes in stepwise. For example, deceleration b that allows the gantry crane 20 to decelerate from rated speed V0 to 5% of the rated speed in 5 seconds and deceleration b that allows the gantry crane 20 to decelerate from 5% of the rated speed to 0 in 1 second may be set, and deceleration distance D2 may be calculated based on deceleration b that changes in stepwise.

The altitudes of reference line Ln, target position Pm, and deceleration start position Pb are set with reference to the ground.

The control unit 37 performs travel control during acceleration period T1 and rated period T2 and performs traveling stop control during deceleration period T3. The travel control and the traveling stop control are performed by adjusting the speed of each of the paired propelling devices 24*a* and 24*b*. Specifically, in the travel control and the traveling stop control, the current, voltage, and frequency of the electric power supplied to the electric motors 28*a* and 28*b* are adjusted by the inverters 29 based on instruction values V1 and V2 which are obtained by subtracting manipulation variable MV from reference instruction value Vz of the electric motor 28*a* or 28*b* on the side to which the gantry crane 20 wants to turn.

The control unit 37, utilizing feedback control of PD control, calculates manipulation variable MV using the following formula 1 and calculates instruction values V1 and V2 using formulas (2) and (3).

In the following formulas (1) to (3), θ1 is a first orientation azimuth angle, θ3 is the angle difference between first orientation azimuth angle θ1 and second orientation azimuth angle θ2, D1 is a distance difference, Gs is a coefficient, and Kx1 to Kx6 (hereinafter expressed as Kx) are gains (the degrees of amplification).

[Math. 1]

$$MV = Gs\cdot\left(Kx1\cdot\theta 3 + Kx2\cdot\frac{d\theta 3}{dt} + Kx3\cdot\theta 1 + Kx4\cdot\frac{d\theta 1}{dt} + Kx5\cdot D1 + Kx6\cdot\frac{dD1}{dt}\right) \tag{1}$$

[Math. 2]

$$\begin{aligned} &MV > 0 \\ &V1 = Vz - |MV| \\ &V2 = Vz \end{aligned} \tag{2}$$

[Math. 3]

$$\begin{aligned} &MV < 0 \\ &V1 = Vz \\ &V2 = Vz - |MV| \end{aligned} \tag{3}$$

Reference instruction value Vz is set such that it is 0% when the electric motors 28*a* and 28*b* are on hold and that it is 100% when the electric motors 28*a* and 28*b* are at a maximum rotation speed. Reference instruction value Vz is set to a different value for each of acceleration period T1, rated period T2, and deceleration period T3. For example, for acceleration period T1, reference instruction value Vz is set to value Va that keeps the acceleration a of the gantry crane 20 constant. For rated period T2, reference instruction value Vz is set to rated rotation speed V0. For deceleration period T3, reference instruction value Vz is set to value Vb that keeps the deceleration b of the gantry crane 20 constant.

Manipulation variable MV is expressed in percentage in the same way for reference instruction value Vz. Manipulation variable MV is for decreasing angle difference θ3 which indicates changes in the relative positions between the receivers 31 to 33 in plan view. Manipulation variable MV is also for decreasing first orientation azimuth angle θ1. In addition, manipulation variable MV is for decreasing distance difference D1.

First orientation azimuth angle θ1 is the azimuth angle of first line segment L1 connecting the receivers 31 and 32 relative to reference line Ln. Second orientation azimuth angle θ2 is the azimuth angle of second normal line L2, which is normal to second line segment L3 connecting the receivers 31 and 33, relative to reference line Ln. Angle difference θ3 is the angle difference between first orientation azimuth angle θ1 and second orientation azimuth angle θ2 and is the angle formed by first line segment L1 and second normal line L2. Distance difference D1 is the distance difference between reference line Ln and movement point Px which is the midpoint of first line segment L1.

Coefficient Gs is a variable for decreasing manipulation variable MV at the time immediately after starting the electric motors 28*a* and 28*b* and the time immediately before stopping the electric motors 28*a* and 28*b* (immediately after the start of travel and immediately before the end of travel). For example, for acceleration period T1 and deceleration period T3, reference instruction value Vz is set by the control unit 37 such that the voltage gradually increases or decreases. In other words, the electric motors 28*a* and 28*b* perform soft start and soft stop at the time immediately after starting and immediately before stopping for suppressing a large increase and decrease in the output torque by changing the voltage gradually so that the increase and decrease in the current is also gradual. Coefficient Gs is a variable for decreasing manipulation variable MV according to the soft start and soft stop. This is advantageous for suppressing a sudden increase in acceleration and deceleration at the time immediately after starting and immediately before stopping.

Gain Kx is set by, for example, the step response method, the threshold sensitivity method, or the like by conducting experiments or tests in advance. Gain Kx may be calculated by auto-tuning for calculating an optimum value by learning from control results based on instruction values V1 and V2 calculated using the above formulas (1) to (3).

For example, in the case where the gantry crane 20 travels in the x-direction from the left to the right, when manipulation variable MV is positive, the gantry crane 20 turns left. On the other hand, when manipulation variable MV is negative, the gantry crane 20 turns right. In this way, the gantry crane 20 travels repeating turns using the speed difference between the paired propelling devices 24*a* and 24*b* until it reaches target position Pm.

Figure 5:
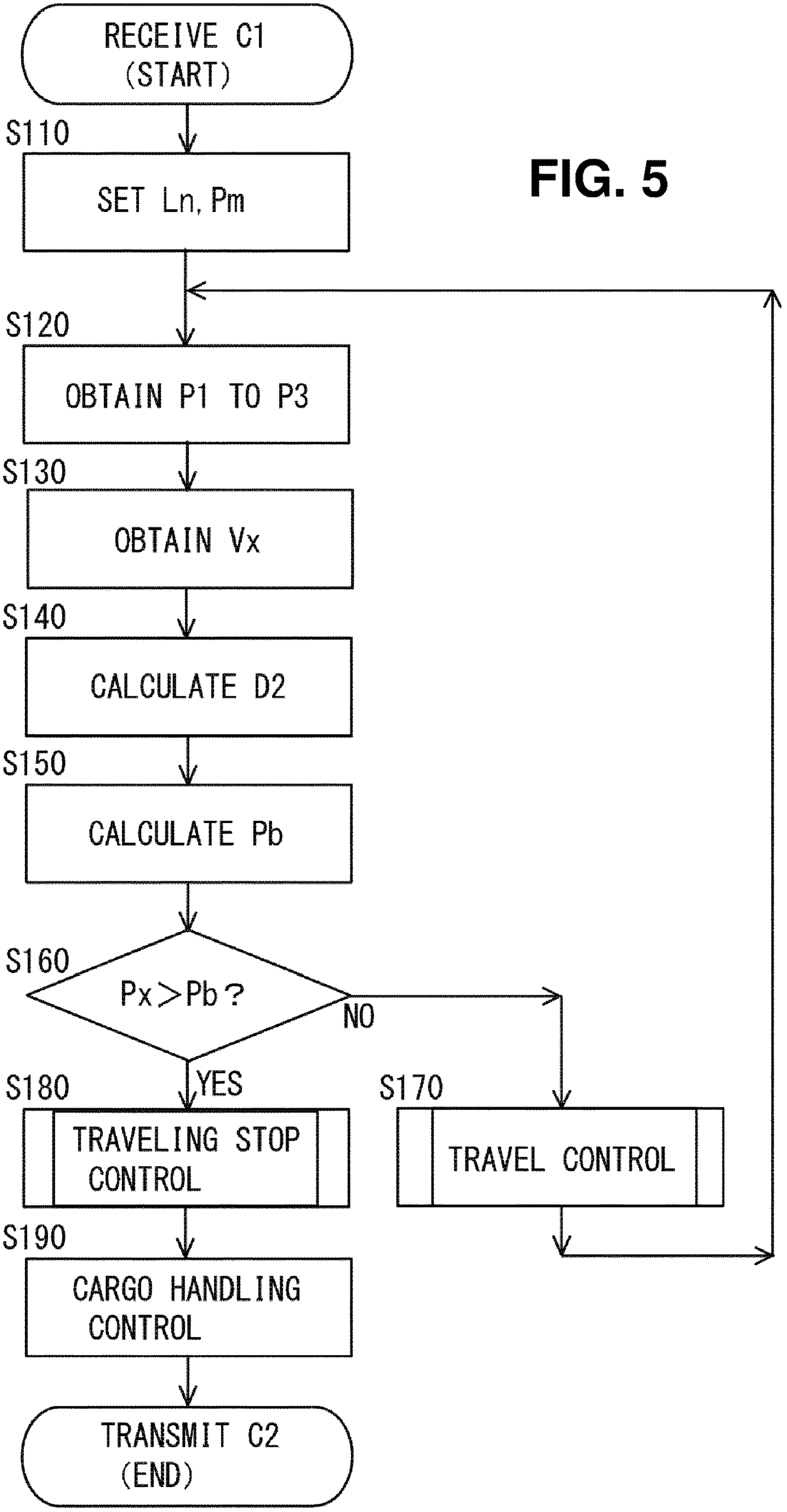
FIG. 5 is a flowchart illustrating an example of a control method of the present invention.
Figure 6:
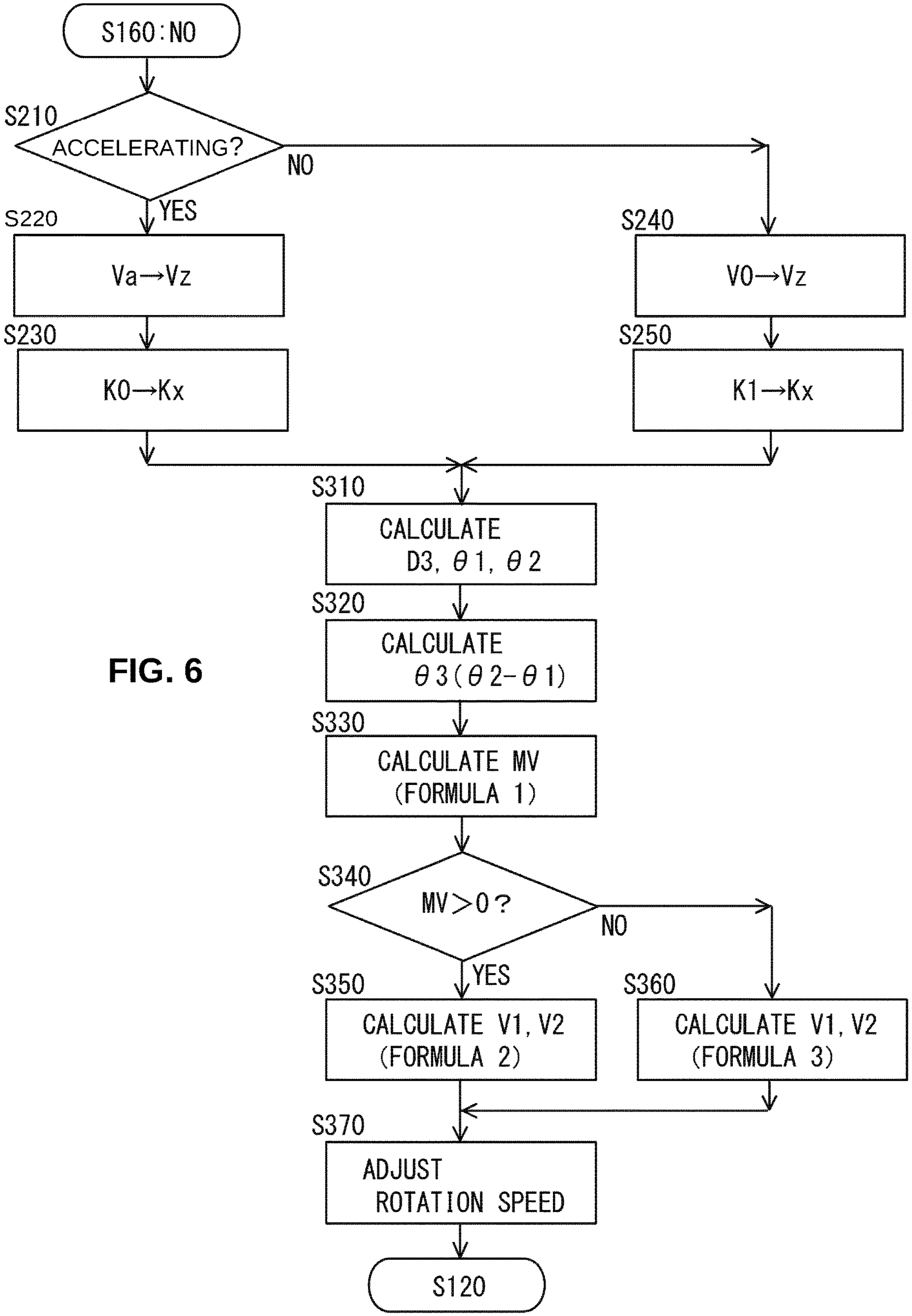
FIG. 6 is a flowchart illustrating an example of S170 in FIG. 5.
Figure 7:
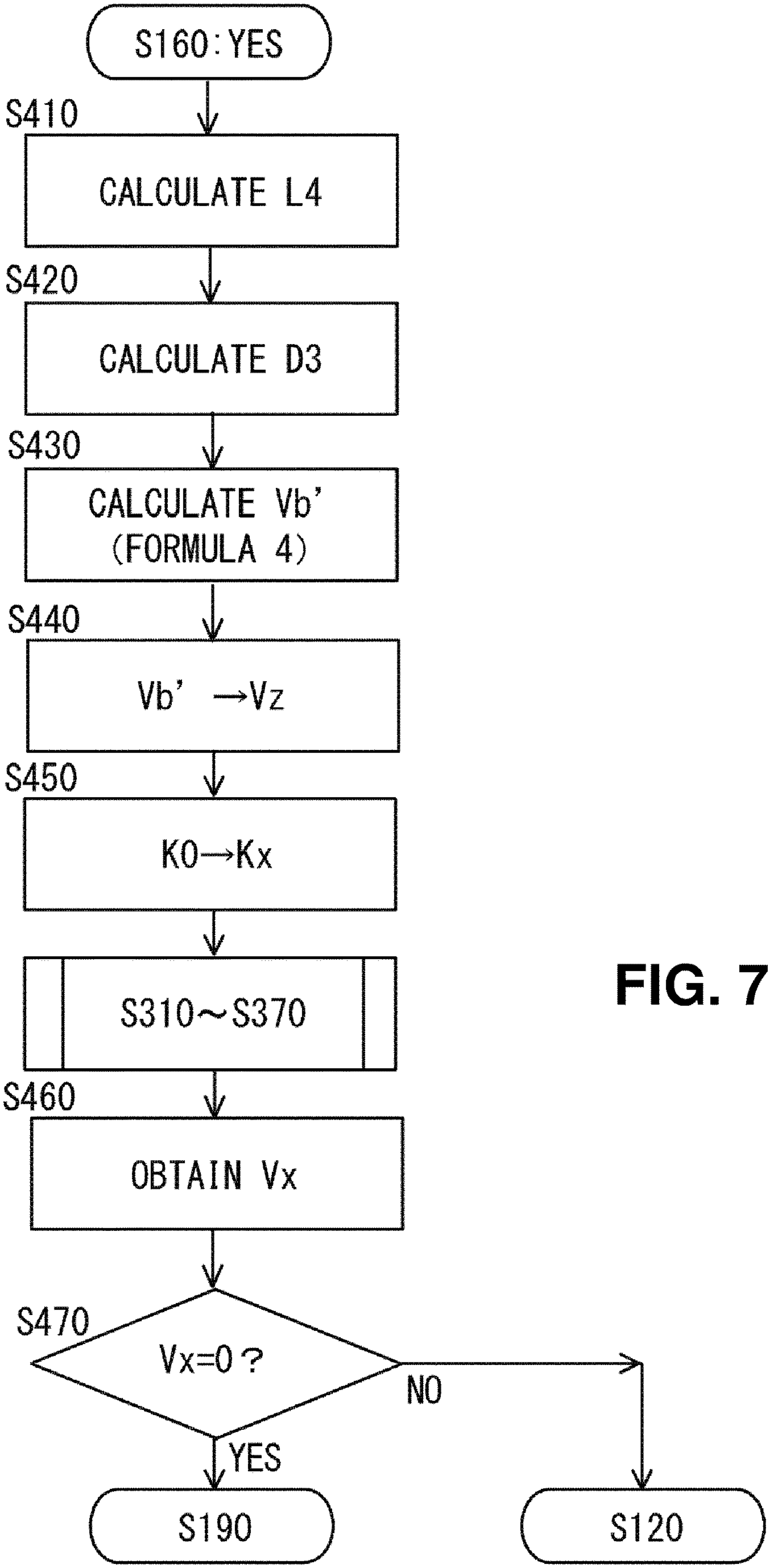
FIG. 7 is a flowchart illustrating an example of S180 in FIG. 5.

As illustrated in FIGS. 5 to 7 as examples, the method of controlling the gantry crane 20 is a method that starts when the gantry crane 20 receives a cargo-handling-work instruction C1 from the host system 18 and reports a completion report C2 meaning the completion of cargo handling work and also a method of running the gantry crane 20 to target position Pm. The receivers 31 to 33 receive information from satellites at specified intervals to obtain the coordinates of positions P1 to P3, and for example, the specified interval is one second.

As illustrated in FIG. 5 as an example, when the communication unit 35 receives a cargo-handling-work instruction C1 transmitted from the host system 18, the control device 34 sets reference line Ln and target position Pm based on the cargo-handling-work instruction C1 (S110). Then, the control device 34 obtains the coordinates of positions P1 to P3 with the receivers 31 to 33 using a global navigation satellite system (S120).

Next, the control device 34 obtains travel speed Vx which is the travel speed in the x-direction of the gantry crane 20 based on the obtained coordinates of positions P1 to P3 (S130). Travel speed Vx is the x-direction component of the moving speed of movement point Px at the present moment and is calculated based on the amount of change in the coordinates of positions P1 to P3. Travel speed Vx may be detected by a sensor provided on the gantry crane 20.

Next, the control device 34 calculates deceleration distance D2 that the gantry crane 20 travels until travel speed Vx becomes zero, based on travel speed Vx and deceleration b set in advance (S140). Deceleration distance D2 may be calculated as the distance that the gantry crane 20 travels until the rotation speeds of the electric motors 28*a* and 28*b* change from currently-set reference instruction value Vz to zero.

Next, the control device 34 sets deceleration start position Pb to the position away from target position Pm by deceleration distance D2 (S150). Deceleration start position Pb is set on reference line Ln.

Next, the control device 34 determines whether movement point Px of the gantry crane 20 has passed over deceleration start position Pb (S160). Note that here the state where movement point Px has passed over deceleration start position Pb means the state where the x coordinate of movement point Px is closer to target position Pm than the x coordinate of deceleration start position Pb.

In the case where it is determined that movement point Px has not passed over deceleration start position Pb, the process proceeds to S170, and the control device 34 performs the travel control illustrated in FIG. 6 as an example.

On the other hand, in the case where it is determined that movement point Px has passed over deceleration start position Pb, the process proceeds to S180, and the control device 34 performs the traveling stop control illustrated in FIG. 7 as an example. After the gantry crane 20 stops by the traveling stop control, the control device 34 performs traverse control for the trolley 25 and lifting control for the hanging tool 21, which are cargo handling control (S190). Next, when the cargo handling control is completed, the control device 34 transmits a completion report C2 to the host system 18 with the communication unit 35, and then this control method is completed.

Figure 8:
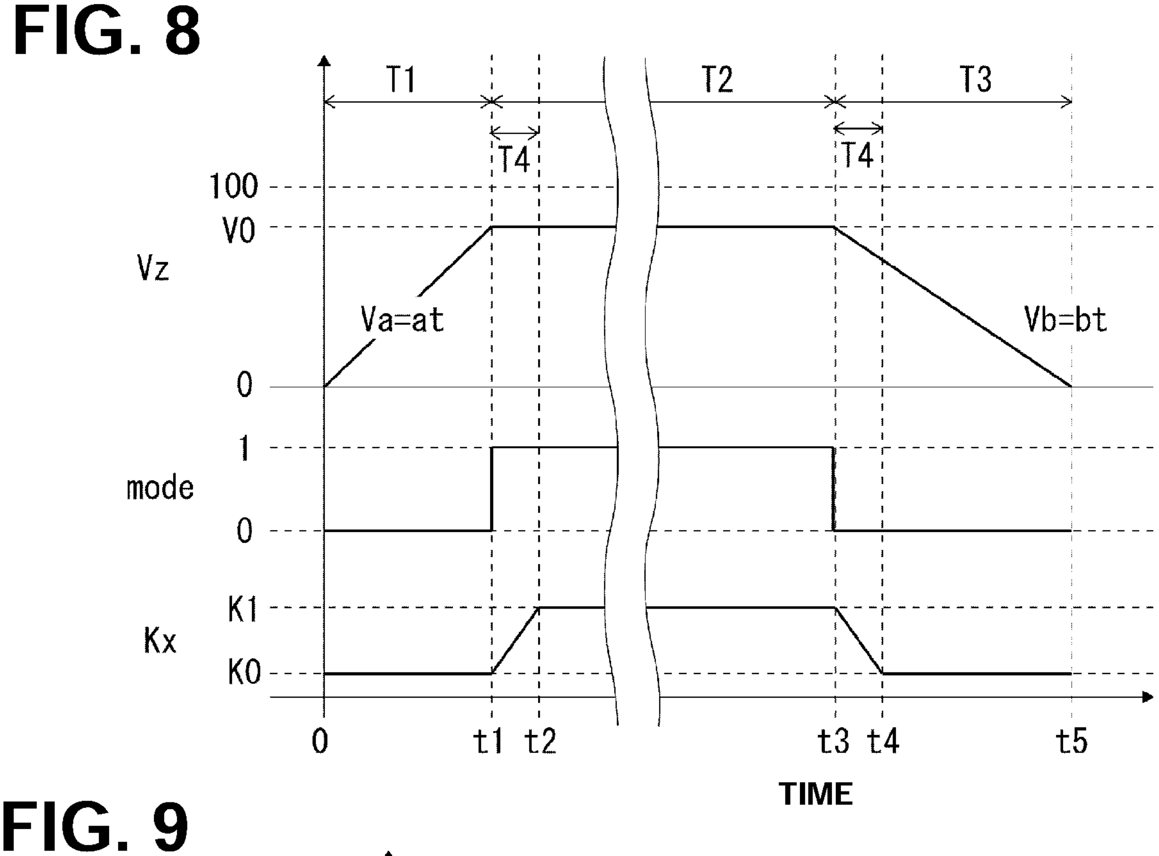
FIG. 8 is an explanatory diagram illustrating an example of changes in a reference instruction value and a gain during an acceleration period, rated period, and deceleration period.

As illustrated in FIGS. 6 and 8 as examples, when the travel control is started, the control device 34 determines whether it is in acceleration period T1 (S210). Whether it is in acceleration period T1 can be determined from the time elapsed since the travel control started or the period in which the rotation speeds of the electric motors 28*a* and 28*b* increase from zero to the rated rotation speed V0. Whether it is in acceleration period T1 may be determined based on the amount of change in the coordinates of positions P1 to P3, the actual change in the travel speed detected by a sensor provided on the gantry crane 20, or the motor characteristics of the electric motors 28*a* and 28*b* (such as the rotation speed, frequency, and voltage).

In the case where it is determined that the gantry crane 20 is accelerating, the control device 34 sets reference instruction value Vz to value Va that keeps the acceleration a of the gantry crane 20 constant (S220). Next, the control device 34 sets gain Kx to posture-oriented gain K0 (S230).

Value Va gradually increases until the rotation speeds of the electric motors 28*a* and 28*b* change from zero to the rated rotation speed V0. Value Va may be increased in proportion to the weight of the load hung by the hanging tool 21 and the ground surface gradient of the container yard 11.

In the case where it is determined that the gantry crane 20 is not accelerating, the control device 34 sets reference instruction value Vz to rated rotation speed V0 (S240). Next, the control device 34 sets gain Kx to follow-oriented gain K1 (S250). Rated rotation speed V0 is a rotation speed at which the electric motors 28*a* and 28*b* can be continuously driven.

For posture-oriented gain K0, gains Kx1 and Kx2 for angle difference θ3 and gains Kx3 and Kx4 for first orientation azimuth angle θ1 in formula 1 are higher than for follow-oriented gain K1. On the other hand, for follow-oriented gain K1, gains Kx5 and Kx6 for distance difference D1 are higher than for posture-oriented gain K0.

When gain Kx is switched, it is desirable that switching time T4 be provided. The step (S230) for setting the above posture-oriented gain K0 is a step for switching the mode from "1" to "0", and the step (S250) for setting follow-oriented gain K1 is a step for switching the mode from "0" to "1". During switching time T4, the gain does not change instantaneously between posture-oriented gain K0 and follow-oriented gain K1, but the gain changes gradually from one to the other. The gain may change during switching time T4 in a manner like a proportional function or an S-curve line.

When setting reference instruction value Vz and gain Kx is completed, the control device 34 calculates first orientation azimuth angle θ1, second orientation azimuth angle θ2, and distance difference D1 based on reference line Ln and the coordinates of positions P1 to P3 (S310). Specifically, the control device 34 calculates first orientation azimuth angle θ1 which is the angle of first line segment L1 relative to reference line Ln. The control device 34 also calculates second orientation azimuth angle θ2 which is the angle of second normal line L2 relative to reference line Ln. The control device 34 also calculates distance difference D1 which is the length of the perpendicular of movement point Px to reference line Ln. Next, the control device 34 calculates angle difference θ3 between first orientation azimuth angle θ1 and second orientation azimuth angle θ2 (S320).

Next, the control device 34 calculates manipulation variable MV using the above formula 1 (S330). Note that it is desirable that manipulation variable MV be limited, and an example of a limit to manipulation variable MV is +10% for a positive limit and −10% for a negative limit. Next, the control device 34 determines whether manipulation variable MV is positive (S340).

Next, if it is determined that manipulation variable MV is positive, the control device 34 calculates instruction values V1 and V2 using the above formula 2 (S350). On the other hand, if it is determined that manipulation variable MV is negative, the control device 34 calculates instruction values V1 and V2 using the above formula 3 (S360).

Next, the control device 34 adjusts the rotation speeds of the electric motors 28*a* and 28*b* with the inverters 29, based on the calculated instruction values V1 and V2 (S370) and the process returns to S120 in FIG. 5.

Figure 9:
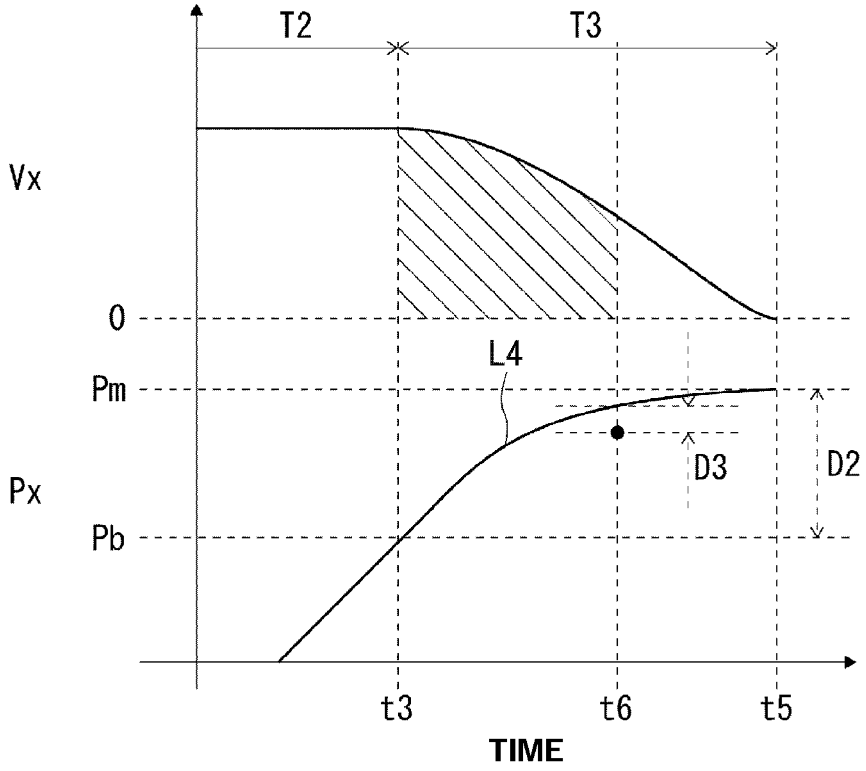
FIG. 9 is an explanatory diagram illustrating an example of changes in the travel speed and movement difference of the crane during a deceleration period.

As illustrated in FIGS. 7 and 9 as examples, when the traveling stop control starts, the control device 34 creates target path L4 (S410). Note that target path L4 may be created during the travel control.

Target path L4 is a path that changes continuously according to the change of travel speed Vx and is a curved path on a plane having time on the horizontal axis and distance on the vertical axis. Specifically, the initial value of the target path L4 is deceleration start position Pb, and target path L4 is calculated by adding time integral values of travel speed Vx (the portion hatched with diagonal lines in the figure), each of which is the movement distance during the specified interval, to the initial value.

Next, the control device 34 calculates movement difference D3 based on target path L4 and movement point Px (S420). Movement difference D3 is the difference in the x-direction between target path L4 and movement point Px at the present moment.

Next, the control device 34 corrects value Vb of reference instruction value Vz based on movement difference D3 using the following formula 4 (S430). In the following formula 4, Vb' is the value obtained by correcting value Vb and, K2 is the gain.

[Math. 4]

$$Vb' = Vb + K2 \cdot D3 \tag{4}$$

In other words, the control device 34 corrects reference instruction value Vz using movement difference D3 as a deviation. In the case where movement difference D3 is positive, it is the case where movement point Px has not reached target position Pm, and in the case where movement difference D3 is negative, it is the case where movement point Px has passed over target position Pm. Correction value Vb' is for decreasing movement difference D3.

Next, the control device 34 sets reference instruction value Vz to the calculated correction value Vb' (S440). Next, the control device 34 set gain Kx to posture-oriented gain K0 (S450).

When setting reference instruction value Vz and gain Kx is completed, the control device 34 performs the foregoing steps S310 to S370. When the rotation speeds of the electric motors 28*a* and 28*b* have been adjusted by the inverters 29 based on the calculated instruction values V1 and V2, the control device 34 obtains travel speed Vx of the gantry crane 20 that changes because of the adjustment (S460). Next, the control device 34 determines whether the obtained travel speed Vx has become zero (S470).

If it is determined that travel speed Vx has not become zero, the process returns to S120 in FIG. 5, and the control device 34 performs the traveling stop control again. On the other hand, if it is determined that travel speed Vx has become zero, the process proceeds to S190 in FIG. 5, and the control device 34 performs the cargo handling control.

When the gantry crane 20 reaches target position Pm, the gantry crane 20 stops in the state where first orientation azimuth angle θ1, second orientation azimuth angle θ2, and angle difference θ3 are approximately zero, and where there is no directional deviation to reference line Ln. When the gantry crane 20 reaches target position Pm, the gantry crane 20 stops in the state where movement point Px is on the normal line passing through target position Pm and normal to reference line Ln, and thus, there is no positional deviation in the x-direction relative to target position Pm. On the other hand, the gantry crane 20 stops in the state where distance difference D1 is not zero, and thus, there is a positional deviation in the y-direction relative to reference line Ln.

As has been described above, when the control system 30 runs the gantry crane 20, the control system 30 detects changes in the relative positions between the receivers 31 to 33, which means distortion generated in the structural member 23, based on the coordinates of positions P1 to P3 determined by the receivers 31 to 33, and the control system 30 adjusts the speed of each of the paired propelling devices 24 *a* and 24 *b* such that the changes in the relative positions become small.

This operation, while the gantry crane 20 is travelling, enables the relative positions between the receivers 31 to 33 to come close to the reference state which is the state of the relative positions at the time when the gantry crane 20 is not travelling. This is advantageous for avoiding excessive distortions in the structural member 23 that would occur when the gantry crane 20 is traveling, and this reduces the time necessary to correct positional deviations and directional deviations resulting from the distortion. Along with this, the efficiency of cargo handling work of the gantry crane 20 is improved.

In the case where a skilled driver is aboard the gantry crane 20 and run it, the skilled driver operates it such that distortion is not generated in the structural member 23. However, in the case where no driver is aboard the gantry crane 20 and where the gantry crane 20 is operated by remote control or automated driving to perform cargo handling, it is difficult to avoid the occurrence of the distortion. In this situation, with the above control system 30, it is possible to determine the occurrence of distortion in the gantry crane 20 using the receivers 31 to 33 instead of driver's visual check. Thus, in the case where the gantry crane 20 is operated by remote control or automated driving, the above configuration is advantageous for avoiding the occurrence of excessive distortions in the structural member 23 of the gantry crane 20 and improves the efficiency of cargo handling.

Note that also in the case where a driver is aboard the gantry crane 20 to operate it, if the determination of the occurrence of distortion by the control system 30 is used for driving assistance for an unskilled driver, it will improve the efficiency of cargo handling.

The control system 30 may perform the travel control to avoid the occurrence of only the distortion in the structural member 23 by using the terms related to angle difference θ3 in the above formula 1, in other words, the terms related to the changes in the relative positions between the receivers 31 to 33, without using the terms of first orientation azimuth angle θ1 and the terms of distance difference D1. For example, this may be performed as control to decrease angle difference θ3 for the case where the gantry crane 20 travels in a method other than the above method and where angle difference θ3 is larger than or equal to a specified threshold.

The above method works with at least two receivers provided on the gantry crane 20. For example, two receivers 32 and 33 in this embodiment can be used as an example for this case. In the case where the number of receivers provided is two, it is preferable that the two receivers be located on a short side and a long side, respectively, of the rectangle that the structural member 23 forms in plan view. It is more preferable that the two receivers are respectively located at two corners of the rectangle, diagonally opposite to each other. In the case where the number of receivers provided is three, it is preferable that the receivers 31 to 33 be respectively located on different sides of the rectangle such that the receivers 31 to 33 form a triangle the apexes of which are the receivers 31 to 33, and it is more preferable that the receivers 31 to 33 be located at three corners of the four corners of the rectangle.

In the case where the receivers 31 to 33 are located in plan view such that the receivers 31 and 32 are apart from each other in the direction orthogonal to the extending direction of the girders 22 and that the receivers 31 and 33 are apart from each other in the extending direction of the girders 22, it is possible to use angle difference θ3 as the foregoing changes in the relative positions. This arrangement makes it possible to obtain the distortion of the structural member 23 as the distortion of the rectangle that the structural member 23 forms in plan view and to express the changes in the relative positions with a simple numerical value. This is advantageous for simplifying the above formula 1 for calculating manipulation variable MV.

In addition to the distortion of the structural member 23, it is desirable that the control system 30 work to avoid the occurrence of the directional deviation and positional deviation of the gantry crane 20 while it is travelling. Specifically, the control system 30 detects first orientation azimuth angle θ1, which is the directional deviation of the gantry crane 20 relative to reference line Ln, based on the coordinates of positions P1 to P3 and adjusts the speed of each of the paired propelling devices 24*a* and 24*b* such that the directional deviation becomes small. The control system 30 also detects distance difference D1, which is the positional deviation of the gantry crane 20 relative to reference line Ln, based on the coordinates of positions P1 to P3 and adjusts the speed of each of the paired propelling devices 24*a* and 24*b* such that the positional deviation becomes small.

Since in addition to the distortion of the structural member 23, the directional deviation and positional deviation of the gantry crane 20 in travelling are corrected relative to reference line Ln as described above, the positional error at the time when the gantry crane 20 reaches the target position Pm can be made small. This operation is advantageous for shortening the time necessary for correcting the positioning error relative to target position Pm.

In order to avoid the occurrence of not only the distortion of the structural member 23 but the directional deviation and positional deviation, it is preferable to use angle difference θ3, first orientation azimuth angle θ1, and distance difference D1 as parameters of PD control as stated in the above formula 1. In this case, it is desirable that the three receivers 31 to 33 be located at three corners of the four corners of the rectangle that the structural member 23 forms in plan view. This arrangement of the receivers 31 to 33 minimizes the number of receivers 31 to 33 within the range where the distortion, directional deviation, and positional deviation of the gantry crane 20 in travelling can be detected.

In the above formula 1, second orientation azimuth angle θ2 may be used instead of first orientation azimuth angle θ1. In addition, distance difference D1 may be the average of the distance difference between the receiver 31 and reference line Ln (the length of the perpendicular of position P1 to reference line Ln) and the distance difference between the receiver 32 and reference line Ln (the length of the perpendicular of position P2 to reference line Ln).

The control system 30 switches gain Kx in the above formula 1 depending on to the traveling state of the gantry crane 20. Specifically, the control system 30 switches gain Kx to posture-oriented gain K0 in acceleration period T1 and deceleration period T3 and switches it to follow-oriented gain K1 in rated period T2. Therefore, in acceleration period T1 and deceleration period T3, the control system 30 can decrease angle difference θ3 and first orientation azimuth angle θ1 in comparison with distance difference D1.

In other words, in acceleration period T1, it is possible to eliminate the directional deviation caused when the distortion of the structural member 23 generated while the gantry crane 20 is on hold is released and the directional deviation resulting from load change or inclination generated immediately after the start of travel and during acceleration. This operation is advantageous for decreasing the deviation from reference line Ln that is caused in the case where the directional deviation of the gantry crane 20 becomes large immediately after the start of travel and then, the travel speed of the gantry crane 20 becomes high.

In deceleration period T3, it is possible to eliminate the directional deviation resulting from load change and inclination that occur during deceleration. This is advantageous for decreasing the directional deviation at the time when the gantry crane 20 reaches target position Pm. The elimination of the directional deviation during deceleration period T3 is advantageous for reducing the distortion of the structural member 23 generated when the gantry crane 20 is on hold, and hence, it is possible to eliminate the directional deviation caused by the distortion generated immediately after the start of travel.

In particular, in deceleration period T3, eliminating the directional deviation of the gantry crane 20 relative to reference line Ln due to the orientation and direction, which can be eliminated only by the travel control, is more focused than eliminating the positional deviation in the y-direction of the gantry crane 20 relative to reference line Ln, which can be cancelled by reflecting the positional deviation to the traverse distance of the trolley 25 in cargo handling. This is advantageous for shortening the time necessary for correcting the directional deviation of the gantry crane 20 due to the travel control.

Note that it is desirable that the control system 30 correct the traverse distance of the trolley 25 in cargo handling control, based on distance difference D1 at the time when the gantry crane 20 has stopped. The traverse distance of the trolley 25 is set based on the row number of the cargo-handling-work instruction C1. Reduction of distance difference D1 from the traverse distance makes the position adjustment of the hanging tool 21 in the y-direction highly accurate.

The control system 30 can make the turn of the gantry crane 20 by the travel control slow by limiting manipulation variable MV calculated with the above formula 1 to reduce the range of the change in manipulation variable MV. This is advantageous for reducing the distortion of the structural member 23 caused in the case where the speed difference between the paired propelling devices 24*a* and 24*b* is too large. Since quick turns of the gantry crane 20 which is a large structure are prevented, it is advantageous for securing the safety while the gantry crane 20 is traveling. The limit of manipulation variable MV should preferably be 5% or more and 15% or less.

By setting limits to manipulation variable MV as described above, the control system 30 can perform travel control with higher accuracy by PD control, without using I actions, which can be a factor of overshooting or hunting, included in in PID control, PI control, or the like. This is advantageous for simplifying control by reducing the number of parameters to be set in the travel control that can eliminate the distortion of the structural member 23 in traveling and the directional deviation and positional deviation of the gantry crane 20.

Since switching time T4 is set during which each gain gradually changes when gain Kx is switched, the control system 30 can switch gain Kx linearly between posture-oriented gain K0 and follow-oriented gain K1. This is advantageous for suppressing sudden changes in manipulation variable MV.

In the traveling stop control, the control system 30 corrects reference instruction value Vz based on movement difference D3 between movement point Px and target path L4 created from travel speed Vx. Therefore, it is possible to decrease movement difference D3 which is generated by eliminating the distortion of the structural member 23, the directional deviation, and the positional deviation. This operation makes close continuously changing target path L4 and movement point Px, and thereby this is advantageous for bringing the stop position close to target position Pm.

In the case where the receivers 31 to 33 are provided at upper positions of the structural member 23, it is desirable that the control system 30 correct reference line Ln and target position Pm based on the coordinates of positions P1 to P3 determined by the receivers 31 to 33. This correction may be performed by either the setting unit 36 or the control unit 37. In this embodiment, it is performed by the setting unit 36.

As illustrated in FIGS. 10 and 11 as examples, the gantry crane 20 inclines in plan view or in side view because of drainage slope provided in the container yard 11 and inclination caused by lifting and sinking of the wheels 27 due to the position and the load of the trolley 25. This inclination causes positional errors between the coordinates of positions P1 to P3 determined by the receivers 31 to 33 located at upper parts of the structural member 23 and the coordinates of positions determined with reference to the ground.

Hence, it is desirable that the setting unit 36 calculate altitude differences h1 and h2 between the receivers 31 to 33 based on the determined coordinates of positions P1 to P3 and that the control system 30 correct reference line Ln and target position Pm based on the calculated altitude differences h1 and h2.

The control unit 37 uses the following formulas (5) to (8) to calculate correction amounts D4 and D5. In the following formulas (5) to (8), H1 is the height of the gantry crane 20, W1 is the width of the gantry crane 20 in front view, B1 is the depth of the gantry crane 20 in side view, θ4 is the inclination of the gantry crane 20 in front view, and θ5 is the inclination of the gantry crane 20 in side view.

[Math. 5]

$$\sin\theta 4 = \frac{h1}{W1} \tag{5}$$

[Math. 6]

$$D4 = \sin\theta 4 \cdot H1 \tag{6}$$

[Math. 7]

$$\sin\theta 5 = \frac{h2}{B1} \tag{7}$$

[Math. 8]

$$D5 = \sin\theta 5 \cdot H1 \tag{8}$$

The inclinations θ4 and θ5 of the gantry crane 20 are based on the drainage slope and inclination due to an unbalanced load and the air pressures of the wheels 27.

Correction amounts D4 and D5 are for shifting reference line Ln and target position Pm to the side on which the gantry crane 20 is inclined.

By correcting reference line Ln and target position Pm based on altitude differences h1 and h2 as described above, it is possible to reduce errors in the positional deviation due to the inclination of the gantry crane 20 caused by the drainage slope, an unbalanced load, and the air pressures of the wheels 27. This is advantageous for shortening the time taken for adjusting positions shifted due to positional errors.

Note that the results of correcting the above reference line Ln and target position Pm may be stored to use them for the next correction. In the case where the slope provided on the container yard 11, such as the drainage slope, is known in advance, the slope may be compared with inclinations θ4 and θ5 used for correcting reference line Ln and target position Pm to perform self-diagnosis for checking an unbalanced load of the gantry crane 20, the decrease in the air pressure of the wheels 27, and the like.

It is desirable that the control system 30 have a diagnostic unit in the control device 34 and that the diagnostic unit perform self-diagnosis on the receivers 31 to 33 and propelling devices 24*a* and 24*b* based on any of angle difference θ3, first orientation azimuth angle θ1 (second orientation azimuth angle θ2), and distance difference D1.

In an example of a diagnostic method, angle difference θ3, first orientation azimuth angle θ1 (second orientation azimuth angle θ2), and distance difference D1 are compared with thresholds set in advance, and diagnosis is made according to whether each of them is larger than the corresponding threshold. In another example, diagnosis is made according to whether the number of times when each of them is larger than the threshold is increasing or whether the frequency of the case where each of them is larger than the threshold during a specified time is increasing.

By performing self-diagnosis on devices used in the control system 30 and devices related to the travel of the gantry crane 20 in addition to the travel control as described above, it is possible to issue a warning prompting for inspection, maintenance, and replacement on the devices. This makes it possible to perform inspection, maintenance, and replacement on the devices before a device actually fails, and this is advantageous for preventing a decrease in the operating ratio due to a failure that would otherwise be caused in traveling. Thus, it improves the efficiency of cargo handling.

In a container terminal 10 in which no driver is aboard the gantry crane 20 and in which the gantry crane 20 performs cargo handling by remote control or automated driving, it is difficult to visually check the gantry crane 20 because the container yard 11 is an unattended area. In this case, by the control system 30 performing self-diagnosis sequentially in real time while the container terminal 10 is in operation, it is possible to detect irregular operations.

Although in the foregoing embodiment, an example of control using the three receivers 31 to 33 has been described, four or more receivers may be used. The above control may be possible by using only two receivers 31 and 33 that are located at corners of the structural member 23 diagonally opposed to each other in plan view. In this case, the control device 34 can calculate the coordinates of position P3 and movement point Px based on the coordinates of positions P1 and P2 determined by the two receivers 31 and 33 and the shape and dimensions of the structural member 23 (the width W1 and the depth B1 of the gantry crane 20). Hence, the number of receivers only needs to be two or more. However, in order to perform the travel control and the traveling stop control of the gantry crane 20 with high accuracy, it is preferable to use three or more receivers.

Although in the foregoing embodiment, description has been made of an example in which the gantry crane 20 is controlled by the control system 30, the control system 30 may control a quay crane 14 or a not-illustrated ceiling crane.

EXPLANATION OF REFERENCE NUMERALS

20 gantry crane
21 hanging tool
22 girder
23 structural member
24*a*, 24*b* propelling device
30 control system
31 to 33 receiver
34 control device

The invention claimed is:

1. A control system for a crane including a hanging tool movable up and down, a structural member having a girder that extends in one direction and supports the hanging tool hung from the girder, and paired propelling devices attached to the structural member to be apart from each other in the extending direction of the girder, characterized in that the control system comprises:

multiple receivers disposed at three corners of the four corners or at two corners diagonally opposite to each other of a rectangle formed by the structural member in plan view; and a control device communicably connected to the receivers and the paired propelling devices, the receivers are configured to determine coordinates of a position, utilizing a global navigation satellite system which are collected by the control system as coordinates of the multiple positions, and when performing travel control in an acceleration period and a deceleration period of the crane as a whole, a state of the rectangle that the structural member forms in plan view at rest is distorted into a non-rectangular shape during acceleration or deceleration is obtained as the distortion of the structural member, the control device is configured to adjust the speed of each of the paired propelling devices by calculating change in a relative position between the receivers in plan view based on the coordinates of the multiple positions determined by the multiple receivers as the distortion, and based on the calculated change in the relative position to perform control to decrease change in the relative position between the receivers in plan view to avoid the occurrence of the distortion.

2. The control system for a crane according to claim 1, wherein in plan view, two of the receivers are located apart from each other in the extending direction, and two of the receivers are located apart from each other in the direction orthogonal to the extending direction, and in plan view, the change in the relative position is the angle difference between a first line segment connecting the two receivers apart in the direction orthogonal to the extending direction and a second normal line normal to the line segment connecting the two receivers apart in the extending direction.

3. The control system for a crane according to claim 2, wherein a reference line extending in the direction intersecting the extending direction in plan view is set in advance in the control device, and the control device adjusts the speed of each of the paired propelling devices based on the coordinates of the positions determined by the receivers to perform control to decrease an azimuth angle that is either a first orientation azimuth angle of the first line segment relative to the reference line or a second orientation azimuth angle of the second normal line relative to the reference line and also to decrease the distance difference between the reference line and a movement point determined by the coordinates of the positions.

4. The control system for a crane according to claim 3, wherein the control device performs control to decrease the angle difference and the azimuth angle.

5. The control system for a crane, according to claim 4, wherein the control device adjusts the speed of each of the paired propelling devices based on the coordinates of the positions determined by the receivers to perform control to decrease the movement difference between the movement point and a target path created based on the travel speed of the crane.

6. The control system for a crane, according to claim 3, wherein the control device adjusts the speed of each of the paired propelling devices based on the coordinates of the positions determined by the receivers to perform control to decrease the movement difference between the movement point and a target path created based on the travel speed of the crane.

7. A control method for a crane, used for running the crane by separately driving paired propelling devices that are attached to a structural member having a girder extending in one direction and configured to support a hanging tool hung from the girder and are located apart from each other in the extending direction of the girder, characterized in that the control method comprises:

when performing travel control in an acceleration period and a deceleration period of the crane as a whole:

determining, with multiple receivers disposed at three corners of the four corners or at two corners diagonally opposite to each other of a rectangle formed by the structural member in plan view, the coordinates of multiple positions, utilizing a global navigation satellite system;

calculating, with a control device, change in the relative position between the receivers in plan view based on the determined coordinates of the positions;

obtaining distortion of the structural member based on a degree to which a state of the rectangle that the structural member forms in plan view at rest is distorted into a non-rectangular shape during acceleration or deceleration; and decreasing the change in the relative position to avoid the occurrence of the distortion by adjusting the speed of each of the paired propelling devices based on the calculated change in the relative position.

* * * * *